United States Patent [19]

Munro

[11] Patent Number: 5,181,180

[45] Date of Patent: Jan. 19, 1993

[54] METHOD AND APPARATUS FOR MONITORING AND MAINTAINING AN OPTIMUM BALANCE BETWEEN THE MAIN PHASES OF A MULTI-PHASE MULTIPLE LOAD LOCAL ELECTRICAL DISTRIBUTION SYSTEM

[76] Inventor: William A. Munro, 8216 - 98 Ave., Edmonton, Alberta, Canada

[21] Appl. No.: 568,209

[22] Filed: Aug. 16, 1990

[51] Int. Cl.5 ............................................ G06F 15/56
[52] U.S. Cl. .................................. 364/492; 364/480; 364/483; 307/39
[58] Field of Search ............... 364/492, 493, 480, 481, 364/483, 505; 324/98, 99 R, 103 R; 307/39, 41

[56] References Cited

U.S. PATENT DOCUMENTS

| | | | |
|---|---|---|---|
| 3,789,201 | 1/1974 | Carpenter et al. | 364/492 |
| 3,987,308 | 10/1976 | Burch | 307/41 |
| 4,110,825 | 8/1978 | Fox et al. | 364/492 |
| 4,146,923 | 3/1979 | Borkan | 364/492 X |
| 4,153,936 | 5/1979 | Schmitz et al. | 364/493 |
| 4,245,319 | 1/1981 | Hedges | 364/492 |
| 4,321,477 | 5/1982 | Bartlett | 364/492 |
| 4,324,987 | 4/1982 | Sullivan, II et al. | 364/492 X |
| 4,345,162 | 8/1982 | Hammer et al. | 364/493 |
| 4,347,576 | 8/1982 | Kensinger et al. | 364/493 |
| 4,363,974 | 12/1982 | Beckwith | 364/492 X |
| 4,464,724 | 8/1984 | Gurr et al. | 364/492 |
| 4,612,619 | 9/1986 | Culp | 364/492 |
| 4,659,943 | 4/1987 | Virant | 307/39 |
| 4,694,192 | 9/1987 | Payne et al. | 364/492 |
| 4,771,185 | 9/1988 | Feron et al. | 364/492 X |
| 4,835,706 | 5/1989 | Asahi | 364/492 |

OTHER PUBLICATIONS

"Handbook for Electric Metering", Chapter VII by Edison Elec. Institute, (8th Edition).

Primary Examiner—Kevin J. Teska
Attorney, Agent, or Firm—Anthony R. Lambert

[57] ABSTRACT

An apparatus which monitors and maintains an optimum balance between the main phases of a multi-phase multiple load local electrical distribution system. A series of sensors monitor the current draw of each load and each main phase. A control system samples the sensors, calculates which loads to transfer or shed to achieve optimum balance between the main phases, based on user defined data for each load and transfers or sheds the loads using relays.

6 Claims, 13 Drawing Sheets

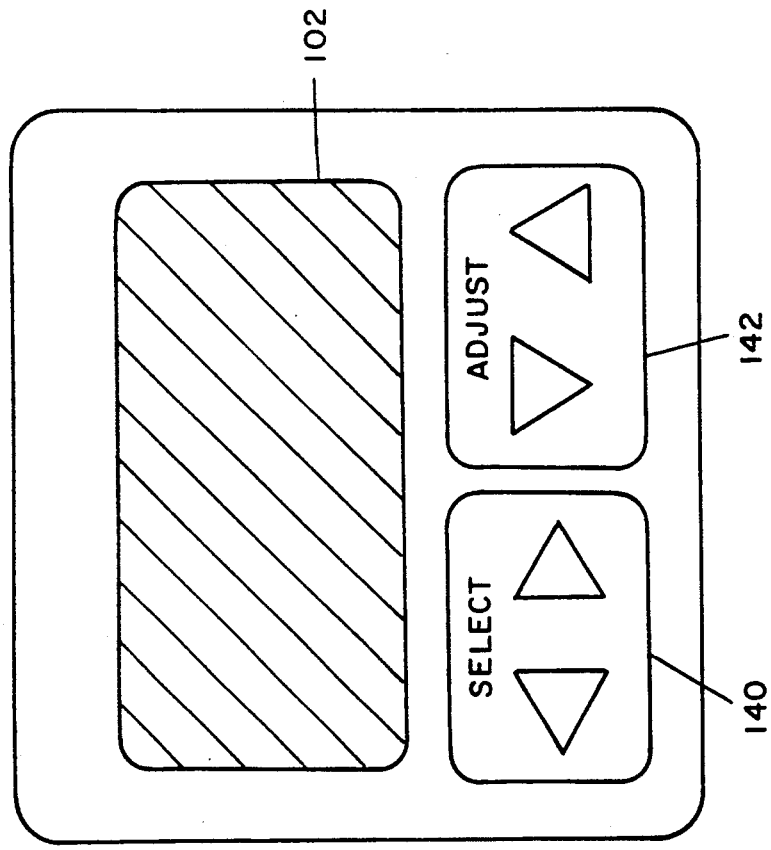

METHOD AND APPARATUS FOR MONITORING AND MAINTAINING AN OPTIMUM BALANCE BETWEEN THE MAIN PHASES OF A MULTI-PHASE MULTIPLE LOAD LOCAL ELECTRICAL DISTRIBUTION SYSTEM

BACKGROUND OF THE INVENTION

1. Field Of The Invention

This invention relates to an electronic circuit for monitoring load imbalances between the two phases of a 110/220 electrical service, and more particularly relates to a circuit which maintains optimum balance between the two phases, either by transferring or shedding loads, thereby reducing the consumption component of the electric bill.

2. Description Of The Related Art

U.S. Pat. No. 3,987,308 entitled "Peak Load Control Energy Saving And Cycling System", issued Oct. 19, 1976 to Burch, is directed to a control system which adds or drops loads to limit peak loads. This reference does not teach transferring a load from one phase to another to balance the current draw between the phases.

U.S. Pat. No. 4,153,936 entitled "Energy Management System", issued May 8, 1979 to Schmitz, is directed to a system which energizes and deenergizes loads in response to preselected conditions and time frames. This reference does not teach transferring a load from one phase to another to balance the current draw between the phases.

U.S. Pat. No. 4,245,319 entitled "Energy Management Method And Apparatus Utilizing Duty Cycle Reduction Synchronized With The Zero Points Of The Applied Voltage", issued Jan. 13, 1981 to Hedges, is directed to apparatus which automatically sheds certain loads when the actual demand of the circuit exceeds the demand limit. This reference does not teach transferring a load from one phase to another to balance the current draw between the phases.

U.S. Pat. No. 4,321,477 entitled "Energy Management Apparatus And Method", issued Mar. 23, 1982 to Bartlett, is directed to a system which controls the power to a plurality of loads while limiting peak demands. This reference does not teach transferring a load from one phase to another to balance the current draw between the phases.

U.S. Pat. No. 4,345,162 entitled "Method And Apparatus For Power Load Shedding", issued Aug. 17, 1982 to Hammer, is directed to apparatus for load shedding duty cycling. This reference does not teach transferring a load from one phase to another to balance the current draw between the phases.

U.S. Pat. No. 4,347,576 entitled Load Management Control Apparatus With Improved Duty Cycle Operation", issued Aug. 31, 1982 to Kensinger, is directed to duty cycle apparatus. This reference does not teach transferring a load from one phase to another to balance the current draw between the phases.

U.S. Pat. No. 4,612,619 entitled "Energy Management Load Leveling", issued Sep. 16, 1986 to Culp, is directed to a load cycling system. This reference does not teach transferring a load from one phase to another to balance the current draw between the phases.

U.S. Pat. No. 4,659,943 entitled "Peak Demand Limiter", issued Apr. 21, 1987 to Virant, is directed to a peak demand limiter used to detect and limit by selective activation the peak load or demand of a circuit. This reference does not teach transferring a load from one phase to another to balance the current draw between the phases.

U.S. Pat. No. 4,694,192 entitled "Simplified Demand Limit Control", issued Sep. 15, 1987 to Payne, is directed to a demand limit control system which sheds loads to limit demand. This reference does not teach transferring a load from one phase to another to balance the current draw between the phases.

Chapter 7 of the "Handbook for Electricity Metering" 8th Ed., published by the Edison Electric Institute, 1111 19th Street N.W., Washington D.C. 20036 (ISBN 0-931032-11-3), teaches that multi-stator meters will register a lower value if the stators are equally loaded than if the stators are not equally loaded. This reference does not teach or suggest a combination of transferring and/or shedding loads between the two phases to optimally balance the loads and thereby register a lower reading.

All of the above mentioned references take advantage of the fact that by limiting the demand to a certain level, energy costs can be reduced. They accomplish this by a variety of methods including peak demand limiting, load shedding and duty cycling. However, none of these reference teach or suggest the advantage of combining these methods with load balancing between the phases of the electrical service.

SUMMARY OF THE INVENTION

Applicant's have invented a system which utilizes load balancing between the phases of a 110, 120, 208, or 240 volt, single and three phase electrical service. The system is also readily adaptable to 277, 347, 480 and 600 three phase electrical service in combination with load shedding and load balancing to reduce the cost of electrical energy by transferring or shedding loads to balance the total loads between the phases of the electrical service, thereby reducing energy costs.

The inventive system hooks directly up to the electrical box of a residential household or a commercial building. Sensors monitor the current drawn by up to six loads, as well as the total current drawn by the two main phase conductors. A control unit periodically samples these sensors, calculates the optimum distribution of the loads over the two main phases, either transferring loads or shedding loads as controlled by the user. The user may input programming to the unit via a key pad. Some of the parameters which may be programmed are whether a particular load is transferrable or sheddable; time periods during the day during which to transfer or shed a particular load, and whether a particular load should be demand cycle limited. The unit also contains an LCD display to show the status of all of the loads at a particular time.

If the user allows all six loads to be transferrable and sheddable 24 hours a day, a 33% savings in energy costs can be obtained.

BRIEF DESCRIPTION OF THE DRAWINGS

FIG. 4 is a schematic diagram of an alternate form of the Energy Saver keypad/display;

FIG. 5 shows the LCD display of FIG. 4 during the clock setting portion of data entry;

FIG. 6 shows the LCD display of FIG. 4 during the setting of a particular load;

DESCRIPTION OF THE PREFERRED EMBODIMENTS

Figure 1A:
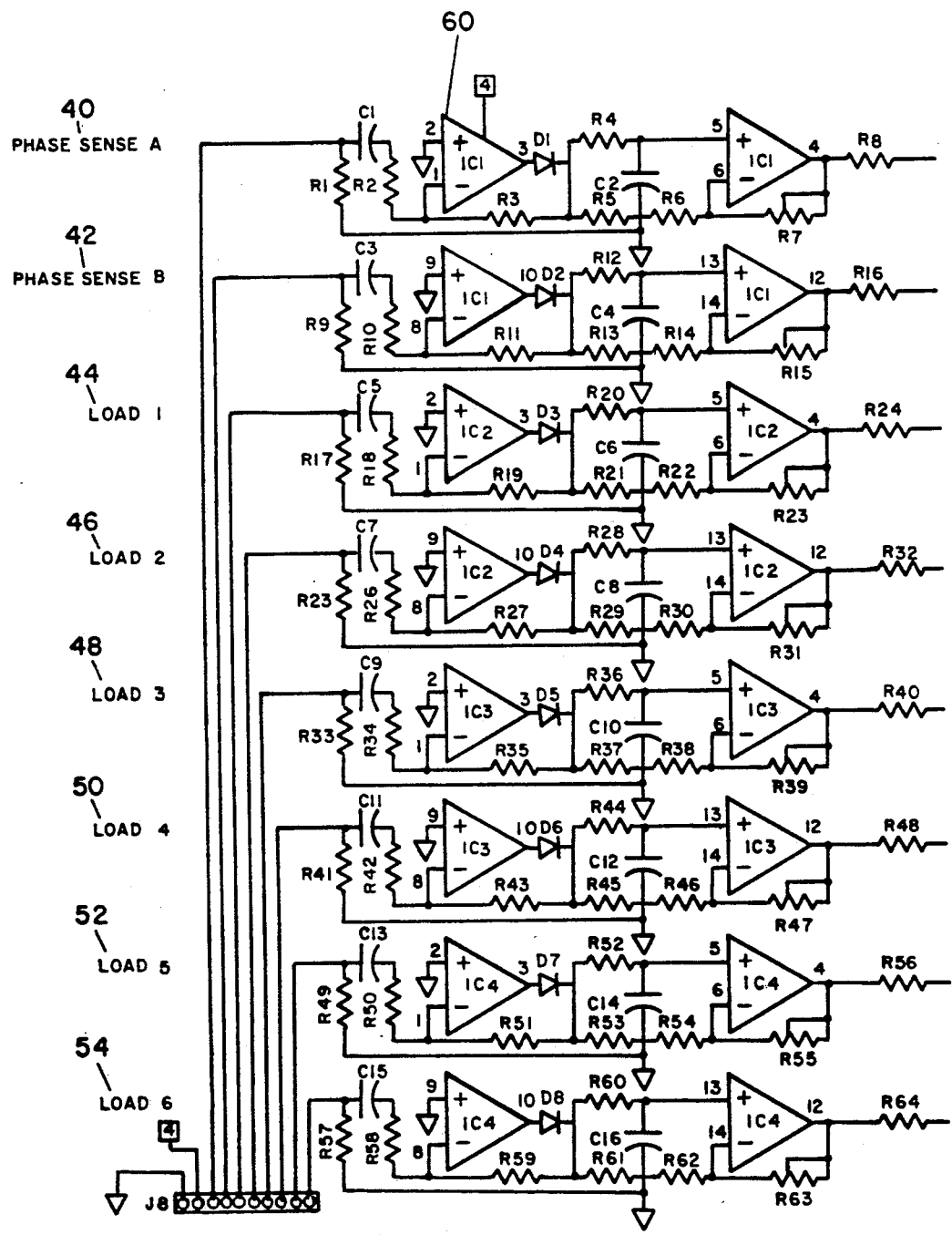
FIGS. 1a, 1b, 1c and 1d are collectively a schematic of the inventive circuit.
Figure 1B:
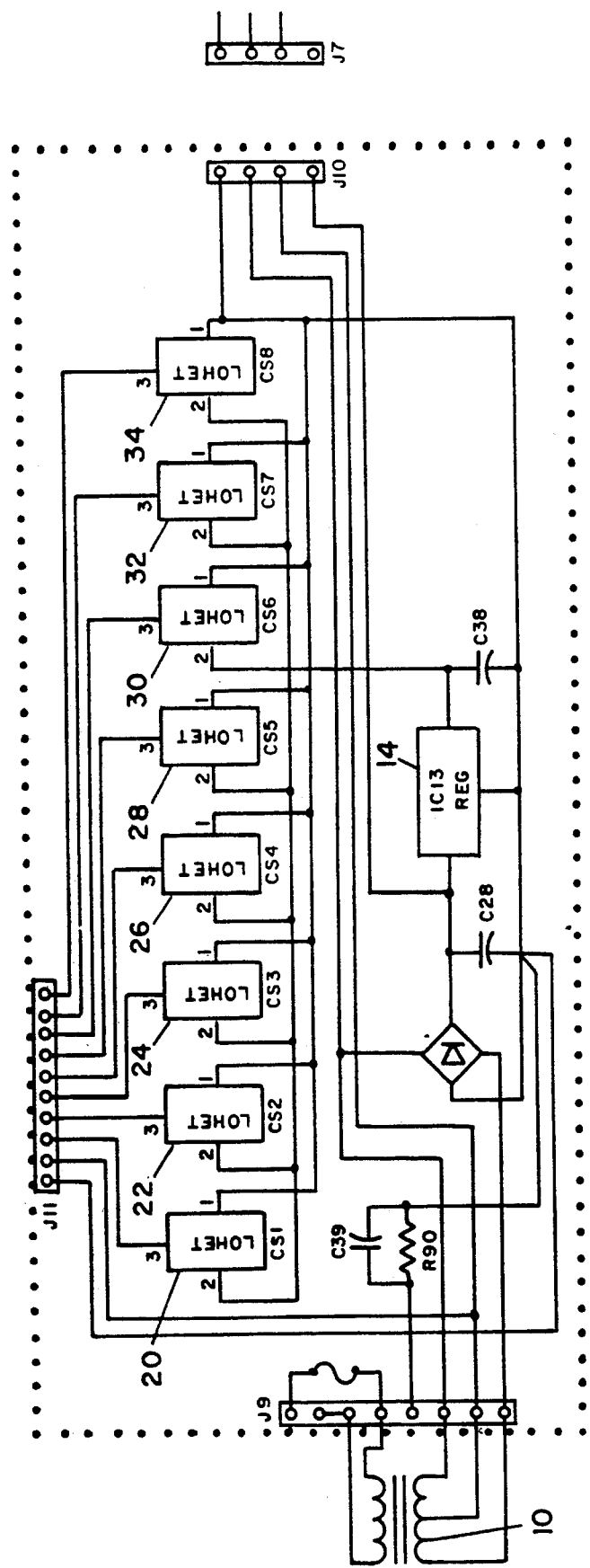
Figure 1C:
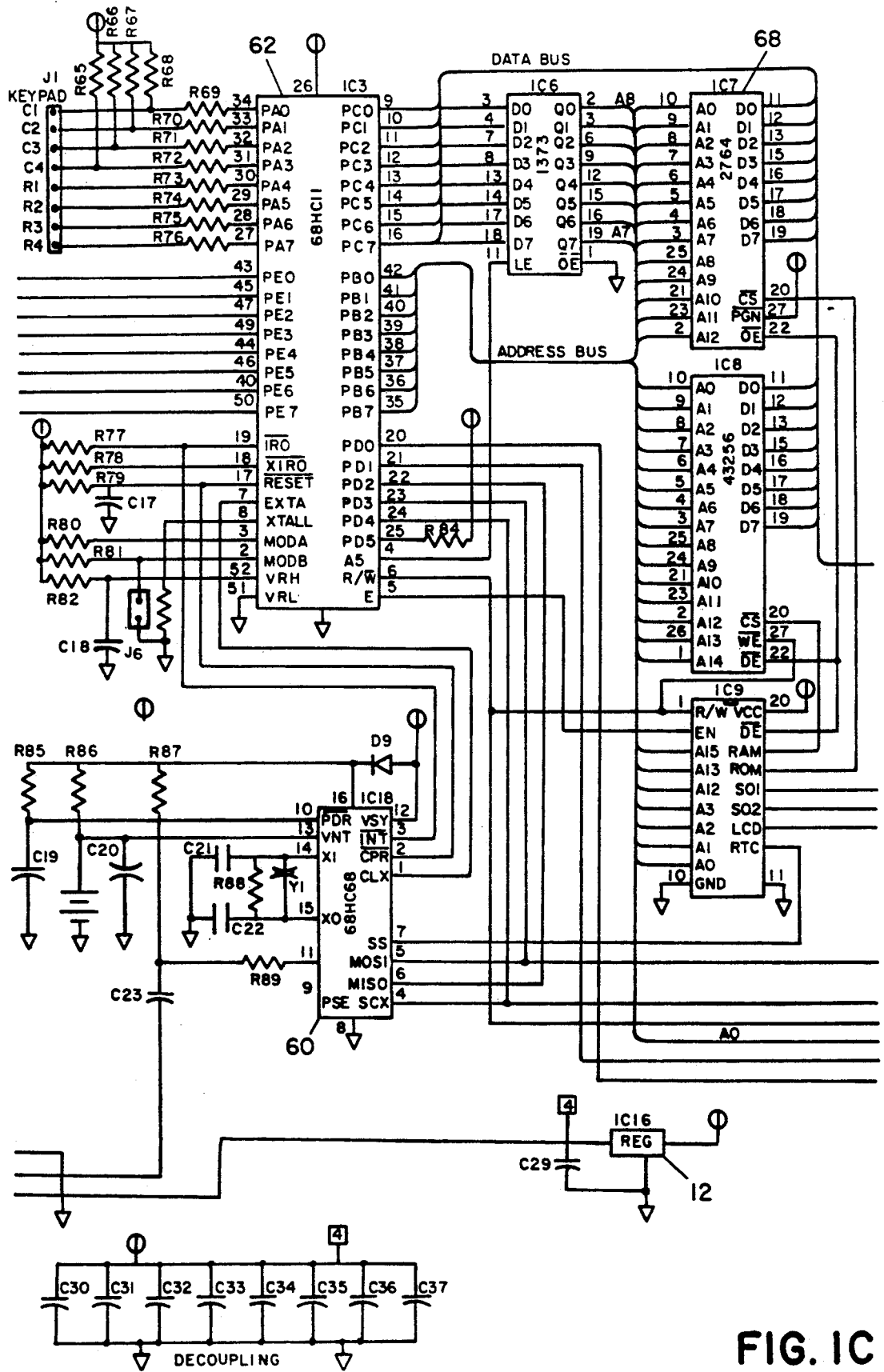
Figure 1D:
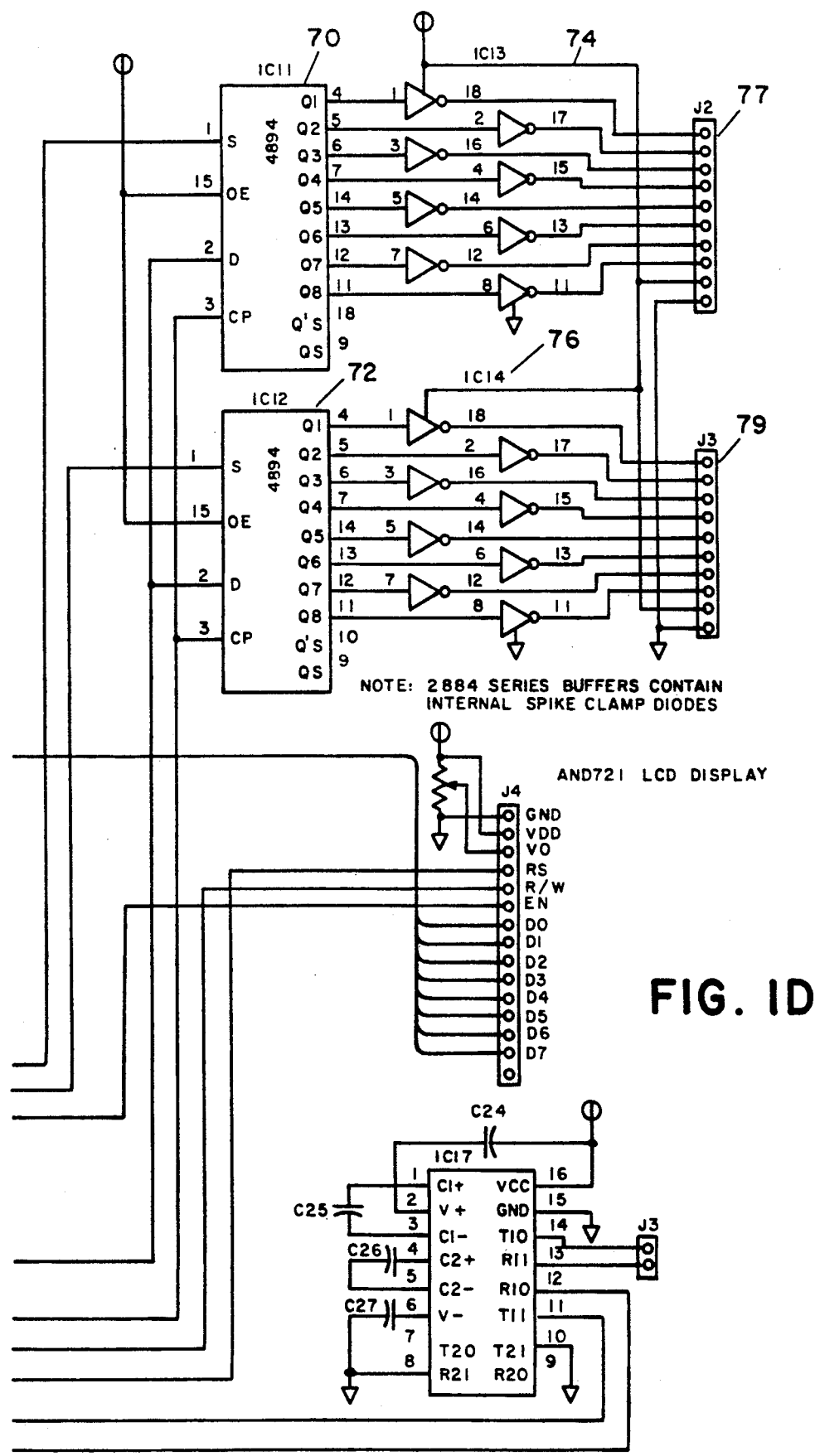

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIGS. 1a, 1b, 1c and 1d, power is supplied to the circuit by means of power transformers shown at 10, which have a 220 volt primary and a 24 volt center tap secondary. This portion of the circuit in turn provides three different supply voltages: 5 volts for the digital and logic circuits is provided by IC16 shown at 12 which is a 5 volt regulator; 12 volts is provided for the current sensors utilizing IC15, shown at 14, which is a 12 volt regulator, and 24 volts, which is used to power the relay coils connected to jumpers J2 and J3, shown at 77 and 79.

Eight current sensors, which are Linear Output Hall Effect Transducers (LOHET) are shown as circuit elements CS1 through CS8, and referred to respectively as 20, 22, 24, 26, 28, 30, 32, and 34. Current sensor 20 senses the current draw of one of the main phase conductors designated PHASE SENSE A, shown at 40. Current sensor 22 senses the current draw of the other main phase conductor, designated PHASE SENSE B, shown at 42. Current sensors 24, 26, 28, 30, 32, and 34 sense the current draw of LOADS 1 through 6, shown respectively as 44, 46, 48, 50, 52, 54. Loads 1 through 6, are selected branch circuit conductors. Inputs 40 through 54 act as inputs to the precision rectifiers circuit shown generally at 60. Each precision rectifier circuit consists of two LM324 operational amplifiers (OP AMPS) and associated components. The first stage OP AMP acts as a precision rectifier with the second stage OP AMP acting as a variable gain stage which is used to trim the outputs for calibration purposes. The output of the eight precision rectifier circuits provides eight filtered DC signals to the inputs of the eight channel 8-bit Analog to Digital Converter (A/D), which is part of a 8-bit microcomputer MC68HC11A4 manufactured by Motorola. The inputs to the 8-bit eight channel A/D converter are designated as pins 43 through 50 on the microcomputer, which is shown at 62. The A/D converter, which is a portion of microcomputer 62 polls each of the pins 43 through 53, converting each analog signal to a digital value, each of which is then loaded into a memory address location which is then utilized by the CPU when executing the control program. It should be noted that the AC signals which act as inputs 40 through 54 are directly proportional to the amount of current flowing through the associated main phase sensor A or phase sensor B or the branch circuit conductor LOADS 1 through 6. It should also be noted that resistors R7, R15, R23, R31, R39, R47, R55, and R63 are variable potentiometers which are used to calibrate these precision rectifier circuits. Calibration of the variable potentiometer is used to make all of the precision rectifier circuits identical. It is anticipated that with precision components the precision rectifier portion of the circuit could be eliminated.

In most instances, the two main phase conductors 40 and 42 will have three loads connected to each phase. Of course, this invention could be easily modified to handle any number of loads, as well as increase the numbers of main phases. In operation, the circuit operates to try and maintain the optimum balance between phase A and phase B by either independently switching loads 1 through 6 to the opposite phase (TRANSFER) or by disconnecting the branch circuits entirely (SHEDDING) depending on the user defined parameters discussed below. As an example, if the main phase conductor A was drawing 20 amps and main phase B was drawing 10 the total current draw measured by the meter would be $(20)^2+(10)^2=500$. The program would calculate how best to distribute the loads between each main phase A or B so that each would draw 15 amps. If each phase drew 15 amps the meter would register $(15)^2+(15)^2=450$, which is 50 less than the unbalanced condition. So for example, if load 2 was connected to phase A and was drawing 5 amps the program would transfer this to phase B, thereby balancing the loads drawn by phase A and phase B, which would result in a cheaper electric bill without having to shed any loads.

Referring to microprocessor 62 again, pins 17, 18 and 19's functions are well known in the art and do not need any discussion here. Pin 7 is the external A pin (EXTA), and is connected to the clock pin (CLK) of IC10 shown at 66. This clock is a read time clock, supplied by Motorola under model number 68HC68T1, and is used to provide the time and date information for the CPU when executing the control program. This clock also utilizes battery backup in case the power is interrupted to the board. The operation of this clock and the micro processor is well known in the art. Pins 2 and 3, the mode A and mode B pins (MODA and MODB), select the mode in which the micro processor runs. In the preferred embodiment, these pins are configured to indicate that the micro processor is using an external memory for program storage, in this particular instance, IC7 shown at 68. Pins 51 and 52 are voltage reference low and voltage reference high. In the present embodiment voltage reference low is ground and voltage high is 5 volts. Pin 1 is ground, pin 26 is the power supply. Pins 9 through 16 are the eight data Input/Output bits (I/O), which act as inputs to IC6, IC7, and IC8 as well as the LCD display. IC6 is a latch. IC7, IC8 and IC9 provide 16 bits of addressing. IC9 is a PAL and is used to enable the RAM IC8 or the ROM IC7. The RAM memory IC8 is used by the processor when executing the program and storing results of calculations. IC7 is a 8k by 8 EPROM commercially available as a 2764 EPROM chip.

Pins 20 and 21 or PD 0 and PD 1, which are input to IC17 are used for Serial I/O for monitoring the device and for remote diagnostics. IC17 is a RS232 level converter, the use of which is well known to those skilled in the art.

Figure 2:
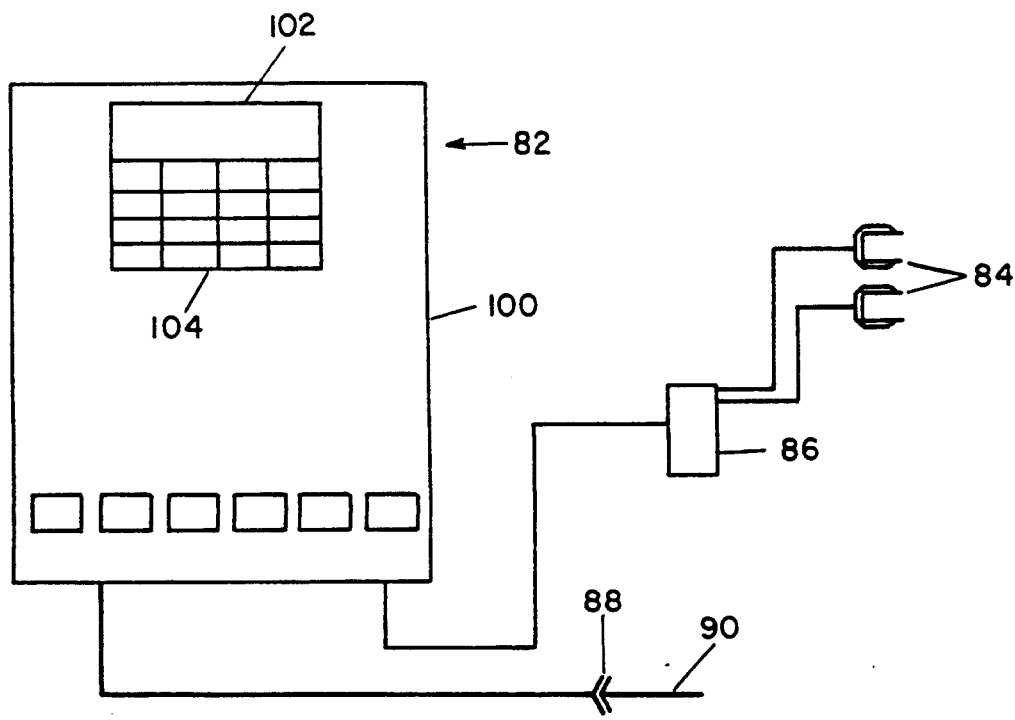
FIG. 2 is a schematic diagram of the Energy Saver front panel.
Figure 3:
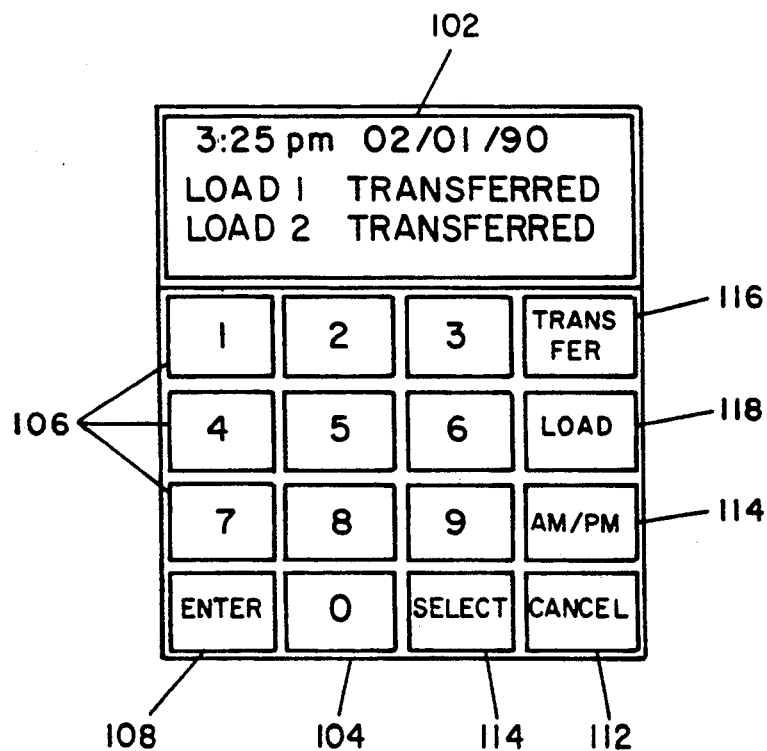
FIG. 3 is a magnified view of the key pad of FIG. 2.
Figure 7A:
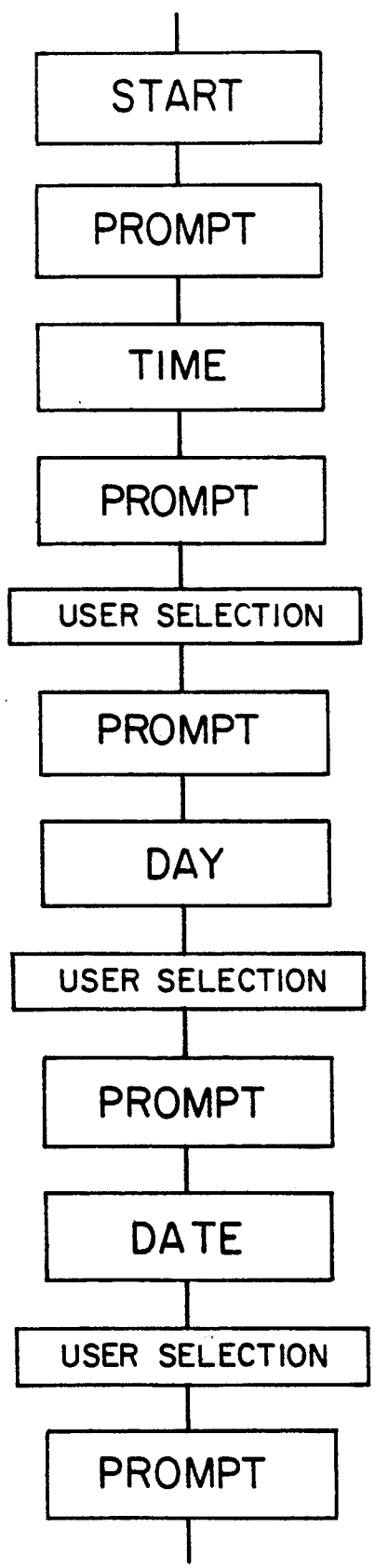
FIGS. 7a, 7b, 7c and 7d are collectively a flow chart of the programming of the device via the key pad, and FIGS. 8a, 8b, 8c and are collectively a flow chart of the control program.
Figure 7B:
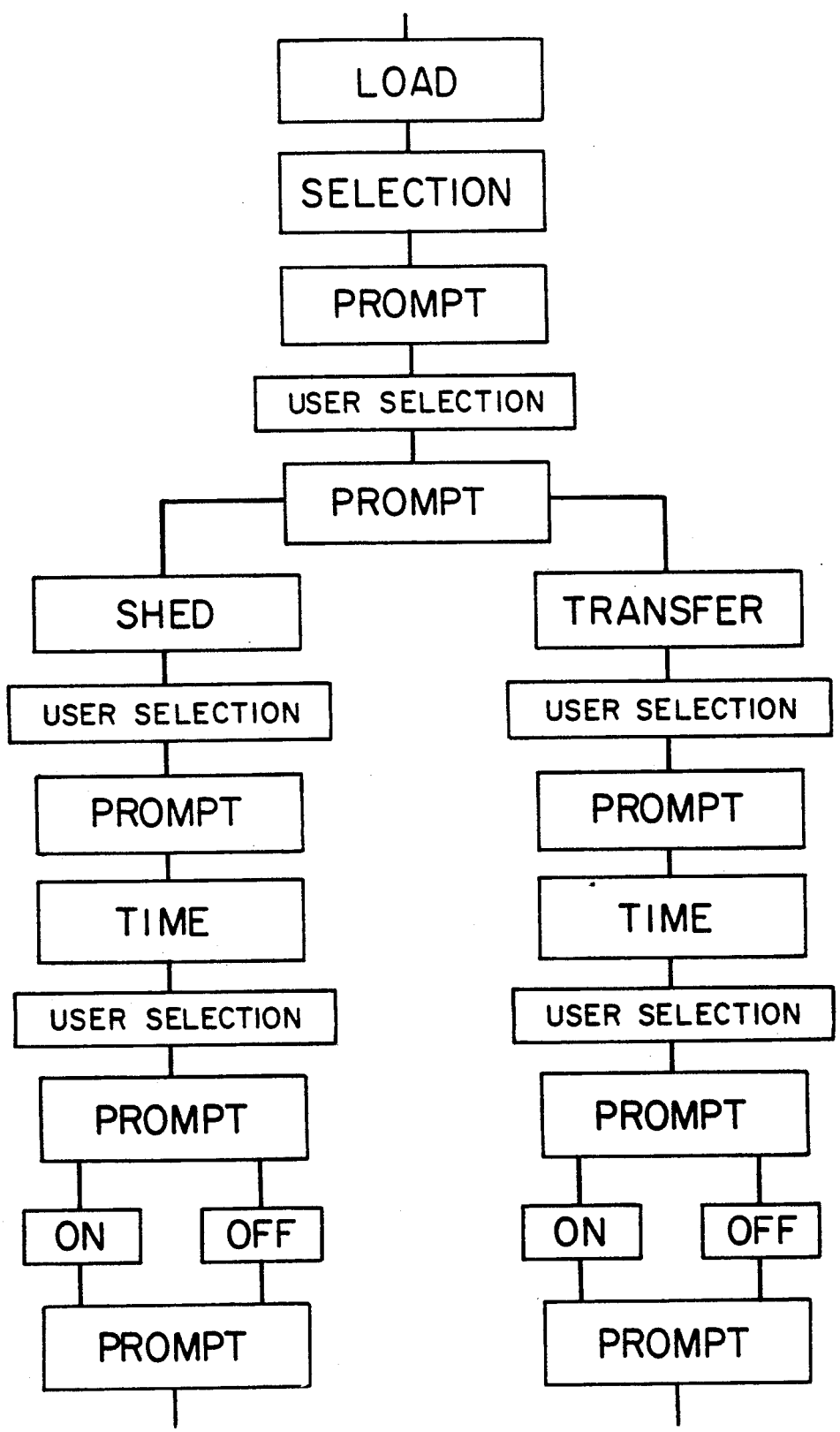
Figure 7C:
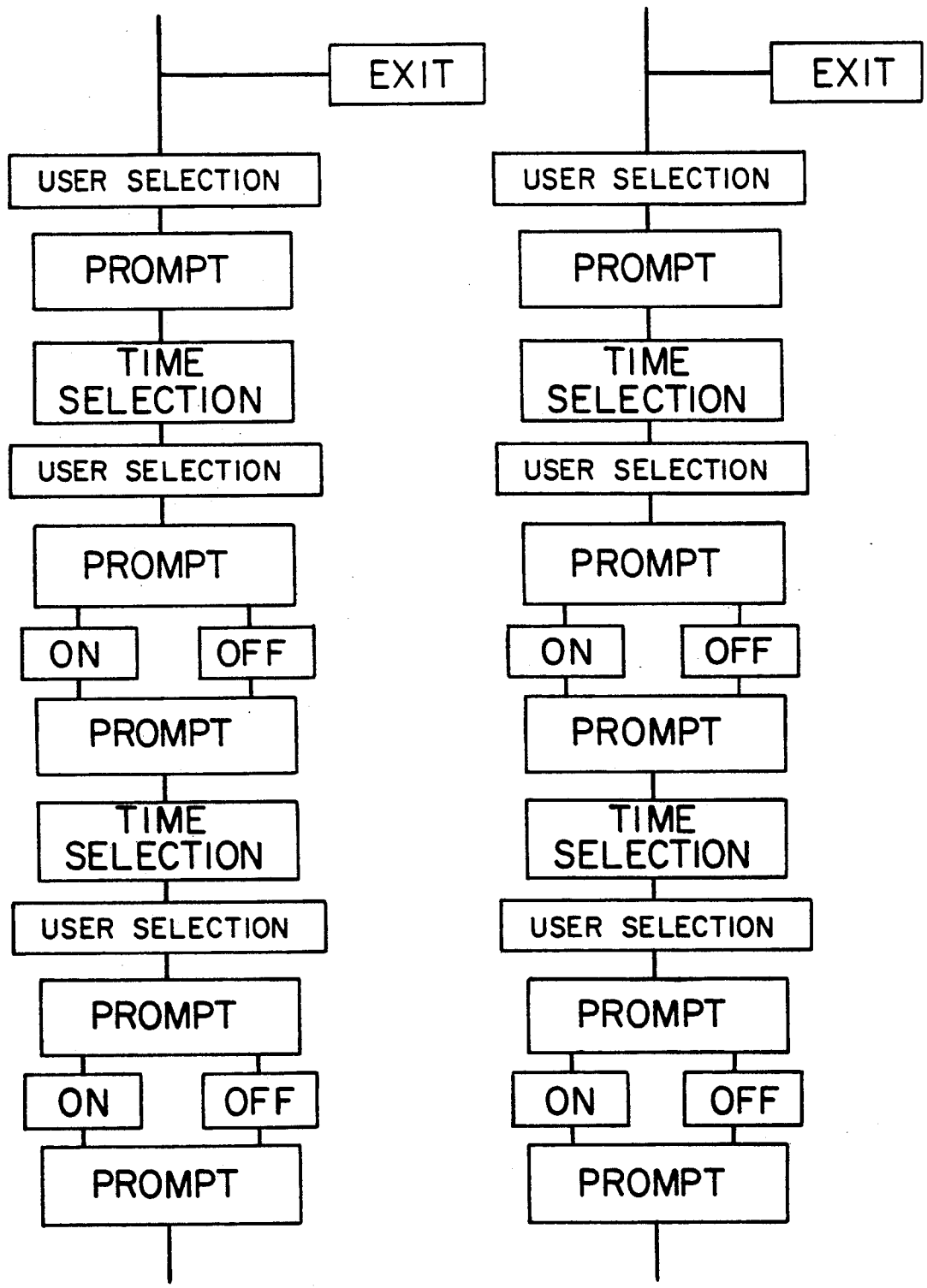
Figure 7D:
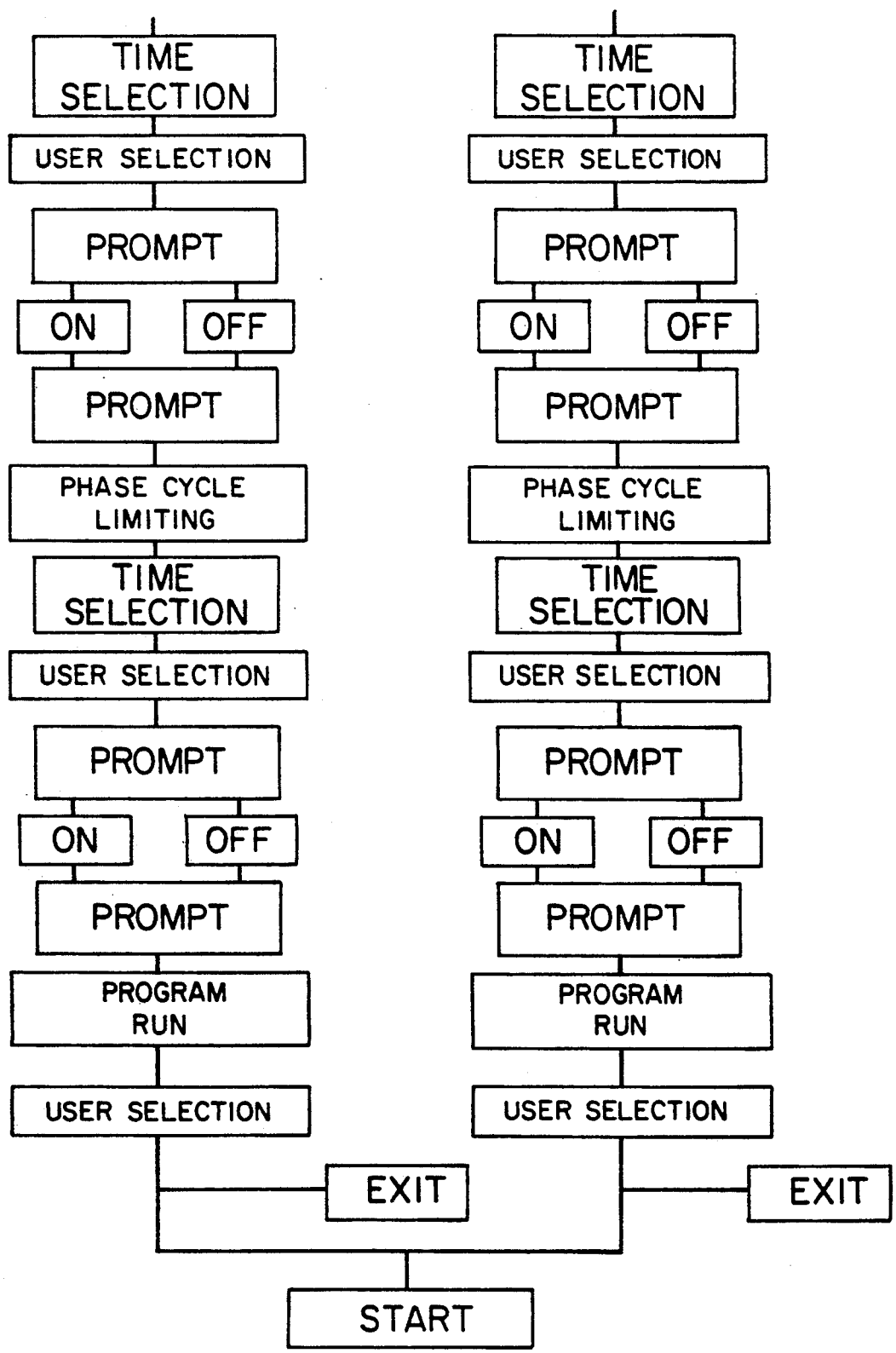
Figure 8A:
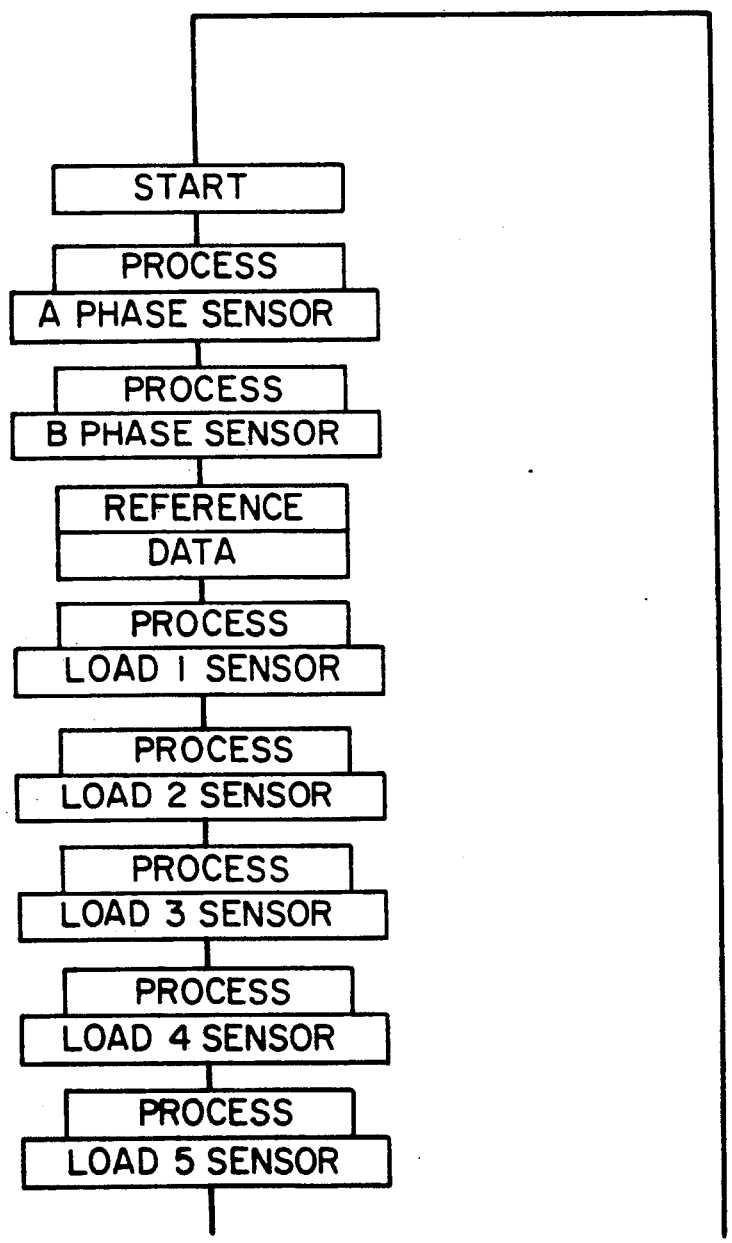
Figure 8B:
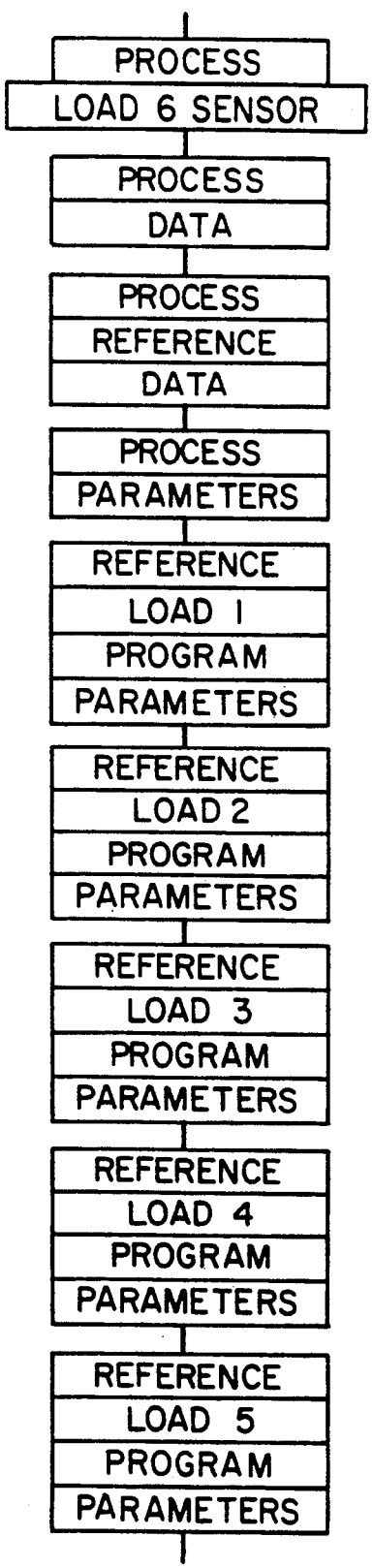
Figure 8C:
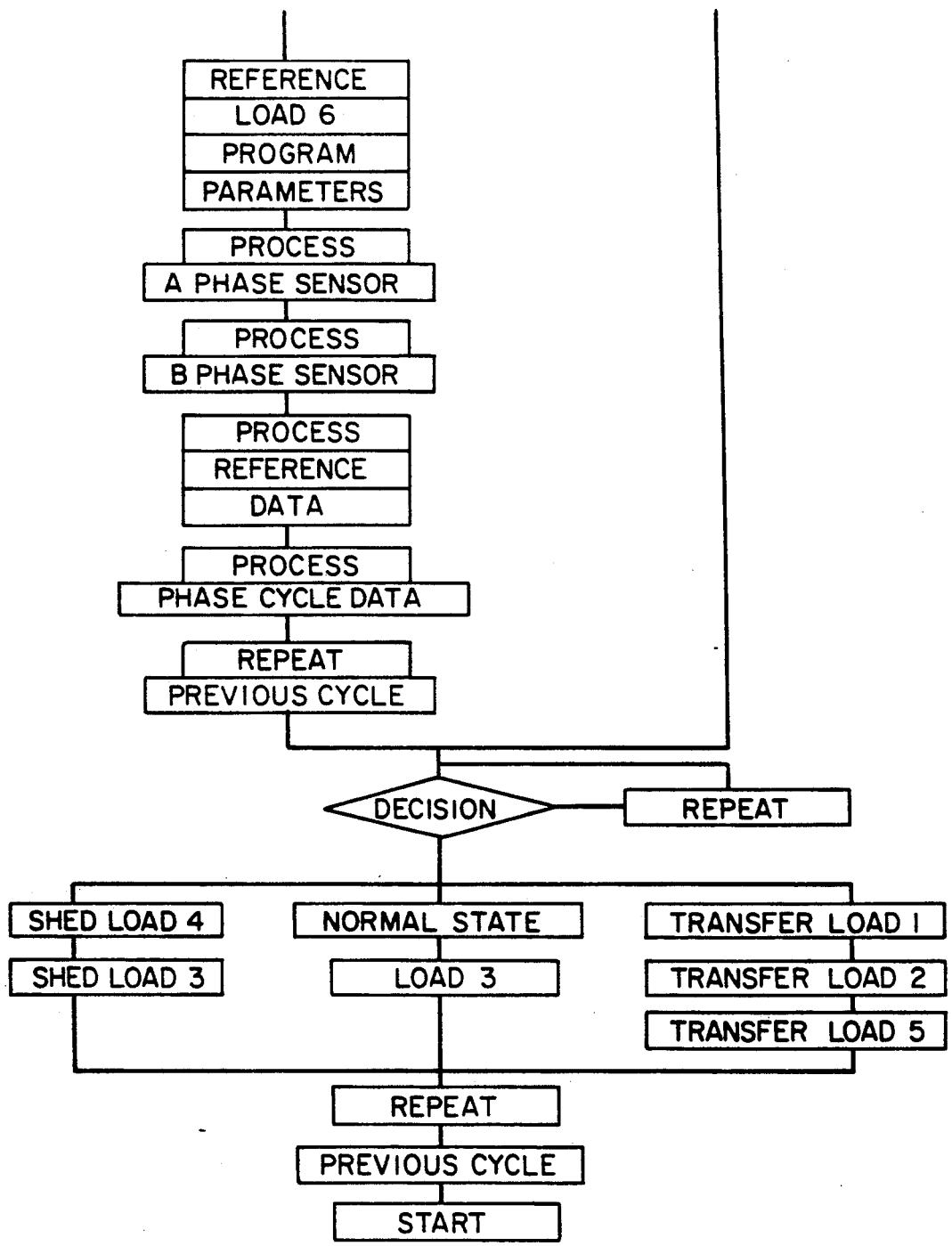

Referring again to the microprocessor 62, pins 27 through 34, are inputs from the key pad. The key pad is shown as part of the Energy Saver~shown in FIG. 2. FIG. 2 shows the microprocessor 82, input from current sensors as shown at 84, wiring harness and terminal block 86, panel connector 88 and buss harness 90. The front panel 100 of the Energy Saver~ contains an eighty character LCD display which provides information about the status of each load, shown at 102. The front panel 100 also contains a key pad which is shown more clearly in FIG. 3. The key pad shown generally at 104 has numeric entry keys 106, an ENTER key 108, a SELECT key 110, a CANCEL key 112, an AM/PM key 114 for toggling between AM or PM, a TRANSFER key 116 for inputing the transfer sequence, and a LOAD key 118 for inputing the load selection. It should be understood that any type of keypad or LCD display could be utilized, depending on the interface that the user desires. It would be routine engineering to adapt the program to function with a different key pad arrangement and LCD display.

Referring now to FIGS. 4 through 6, an alternate form of the Energy Saver™ keypad/display are shown. LCD display 102 is still a 4 line, 80 character display. However, the keypad of FIG. 3 has been replaced by the SELECT keys 140 and the ADJUST keys 142. The software which controls the input of data into the program must also be modified accordingly. It is considered routine engineering to modify the software to operate the alternate keypad/display. The keypad/display of FIG. 4 is the preferred user interface due to its simpler operation. In operation, the SELECT keys move the cursor from the one active location to another on the screen. The cursor is a flashing block on the lcd screen. When the cursor is positioned over an active location the contents of the location may be altered using the ADJUST keys.

FIG. 5 shows the cursor at the position referred to as 144. The user simply can change modes by using the ADJUST keys. FIG. 5 shows the CLOCK mode, which allows input of the current time and date. The actual values are entered using the SELECT keys to position the cursor, then the ADJUST keys to alter the value to the correct value.

FIG. 6 shows the cursor at position 146 with the display adjusted for Transfer mode. The user selects the load number by scrolling through the choices using the ADJUST keys. Next the user selects one of the three active periods, then inputs the start and stop times for that period. The user may set start and stop times for all three periods. The SHED mode and Phase Cycle Limiting mode work similarly.

Referring now to FIGS. 1a, 1b, 1c and 1d again, IC9 is for a portion of the address bus and is used to enable and disable the RAM, ROM and the latches shown as 70 and 72 respectively, and IC11 and IC12 which are 4094's. The output of the latches are then fed to buffers IC13 and IC14 shown respectively at 74 and 76. The outputs of the buffers are 16 relays. There are two relays per branch circuit load, one relay is used for shedding and one relay is used for transferring. The LCD display is controlled using the AND721. This is its own separate unit with its own on-board microprocessor memory and instruction register and program. The display is enabled using the LCD switch and IC9. It is connected to the address bit 0 and the R/W line is connected to pin 6 of the microprocessor. D0 through D7 are the data line which correspond to pins 9 through 16 on themciro processor 62. The LCD display is 4 lines by 20 characters for a total of 80 characters. In operation, ASCII character are simply fed out using the eight data lines and sent to the LCD display where it is shown on the display at the location that the cursor is at.

Shown below is the parts list which corresponds to the components used in FIGS. 1a, 1b, 1c and 1d.

| Item | Comp | Device | Item | Comp | Device |
|---|---|---|---|---|---|
| 1 | #13 | *R88 | 51 | CS4 | LOHET |
| 2 | #14 | *R88 | 52 | CS5 | LOHET |
| 3 | #15 | *R88 | 53 | CS6 | LOHET |
| 4 | #16 | *R88 | 54 | CS7 | LOHET |
| 5 | #17 | *R88 | 55 | CS8 | LOHET |
| 6 | #18 | *R88 | 56 | D1 | 1N4148 |
| 7 | #24 | FUSE | 57 | D10 | 1N4005 |
| 8 | BAT | BAT | 58 | D11 | 1N4005 |
| 9 | C1 | 1U0R25 | 59 | D12 | 1N4005 |
| 10 | C10 | 47UT25 | 60 | D13 | 1N4005 |
| 11 | C11 | 1U0R25 | 61 | D2 | 1N4148 |
| 12 | C12 | 47UT25 | 62 | D3 | 1N4148 |
| 13 | C13 | C1 | 63 | D4 | 1N4148 |
| 14 | C14 | 47UR25 | 64 | D5 | 1N4148 |
| 15 | C15 | 1U0T25 | 65 | D6 | 1N4148 |
| 16 | C16 | 47UT25 | 66 | D7 | 1N4148 |
| 17 | C17 | C1 | 67 | D8 | 1N4148 |
| 18 | C18 | 47UR25 | 68 | D9 | 1N4005 |
| 19 | C19 | 1U0T25 | 59 | HS1 | *R42A |
| 20 | C2 | 47UT25 | 70 | IC1 | LM324 |
| 21 | C20 | C1 | 71 | IC10 | 68HC68 |
| 22 | C21 | TC10P40P | 72 | IC11 | 4094 |
| 23 | C22 | 22PC | 73 | IC12 | 4094 |
| 24 | C23 | 100NM | 74 | IC13 | 2803 |
| 25 | C24 | 10UR50 | 75 | IC14 | 2803 |
| 26 | C25 | 10UR50 | 76 | IC15 | R41K |
| 27 | C26 | 10UR50 | 77 | IC16 | 7805A |
| 28 | C27 | 10UR50 | 78 | 1C17 | MAX232 |
| 29 | C28 | 1000UR25 | 79 | IC2 | LM324 |
| 30 | C29 | 1000UR25 | 80 | IC3 | LM324 |
| 31 | C3 | 1U0R25 | 81 | IC4 | LM324 |
| 32 | C30 | 1U0T35 | 82 | IC5 | 68HC11 |
| 33 | C31 | 1U0M | 83 | IC6 | 74373 |
| 34 | C32 | 10NM | 84 | IC7 | 2764 |
| 35 | C33 | 1U0T35 | 85 | IC8 | 43256 |
| 36 | C34 | 10NM | 86 | IC9 | PLD20 |
| 37 | C35 | 10NM | 87 | J1 | H8 |
| 38 | C36 | 10NM | 88 | J10 | W4 |
| 39 | C37 | 10NM | 89 | J11 | H10 |
| 40 | C38 | 1U0T35 | 90 | J2 | H10 |
| 41 | C39 | 100NMK | 91 | J3 | H10 |
| 42 | C4 | 47UT25 | 92 | J4 | H15 |
| 43 | C5 | 1U0R25 | 93 | J5 | H3 |
| 44 | C6 | 47UT25 | 94 | J6 | H2 |
| 45 | C7 | 1U0R25 | 95 | J7 | W4 |
| 46 | C8 | 47UT25 | 96 | J8 | H10 |
| 47 | C9 | 1U0R25 | 97 | J9 | W8 |
| 48 | CS1 | LOHET | 98 | M1 | R88 |
| 49 | CS2 | LOHET | 99 | M2 | R88 |
| 50 | CS3 | LOHET | 100 | M3 | R88 |
| 101 | M4 | *R88 | 151 | R53 | 15KQ |
| 102 | P1 | *R73 | 152 | R54 | 10KQ |
| 103 | R1 | 10KQ | 153 | R55 | TPH-100K |
| 104 | R10 | 10KQ | 154 | R56 | 10KQ |
| 105 | R11 | 5K1Q | 155 | R57 | 10KQ |
| 106 | R12 | 100KQ | 156 | R58 | 10KQ |
| 107 | R13 | 15KQ | 157 | R59 | 5K1Q |
| 108 | R14 | 10KQ | 158 | R6 | 10KQ |
| 109 | R15 | TPH-100K | 159 | R60 | 100KQ |
| 110 | R16 | 10KQ | 160 | R61 | 15KQ |
| 111 | R17 | 10KQ | 161 | R62 | 10KQ |
| 112 | R18 | 10KQ | 162 | R63 | TPH-100K |
| 113 | R19 | 5K1Q | 163 | R64 | 10KQ |
| 114 | R2 | 10KQ | 164 | R65 | 100KQ |
| 115 | R20 | 100KQ | 165 | R66 | 100KQ |
| 116 | R21 | 15KQ | 166 | R67 | 100KQ |
| 117 | R22 | 10KQ | 167 | R68 | 100KQ |
| 118 | R23 | TPH-100K | 168 | R69 | 4K7Q |
| 119 | R24 | 10KQ | 169 | R7 | TPH-100K |
| 120 | R25 | 10KQ | 170 | R70 | 4K7Q |
| 121 | R26 | 10KQ | 171 | R71 | 4K7Q |
| 122 | R27 | 5K1Q | 172 | R72 | 4K7Q |
| 123 | R28 | 100KQ | 173 | R73 | 4K7Q |
| 124 | R29 | 14KQ | 174 | R74 | 4K7Q |
| 125 | R3 | 5K1Q | 175 | R75 | 4K7Q |
| 126 | R30 | 10K1 | 176 | R76 | 4K7Q |
| 127 | R31 | TPH-100K | 177 | R77 | 10KQ |
| 128 | R32 | 10KQ | 178 | R78 | 4K7Q |
| 129 | R33 | 10KQ | 179 | R79 | 1M0Q |
| 130 | R34 | 10KQ | 180 | R8 | 10KQ |
| 131 | R35 | 5K1Q | 181 | R80 | 4K7Q |

-continued

| Item | Comp | Device | Item | Comp | Device |
|------|------|--------|------|------|--------|
| 132 | R36 | 100KQ | 182 | R81 | 4K7Q |
| 133 | R37 | 15KQ | 183 | R82 | 10KQ |
| 134 | R38 | 10KQ | 184 | R83 | 47KQ |
| 135 | R39 | TPH-100K | 185 | R84 | 10KQ |
| 136 | R4 | 100KQ | 186 | R85 | 1M0Q |
| 137 | R40 | 10KQ | 187 | R86 | 1K0Q |
| 138 | R41 | 10KQ | 188 | R87 | 220KQ |
| 139 | R42 | 10KQ | 189 | R88 | 10MQ |
| 140 | R43 | 5K1Q | 190 | R89 | 220KQ |
| 141 | R44 | 100KQ | 191 | R9 | 10KQ |
| 142 | R45 | 15KQ | 192 | R90 | 100RQ |
| 143 | R46 | 10KQ | 193 | Y1 | R92 |
| 144 | R47 | TPH-100K | | | |
| 145 | R48 | 10KQ | | | |
| 146 | R49 | 10KQ | | | |
| 147 | R5 | 15KQ | | | |
| 148 | R50 | 10KQ | | | |
| 149 | R51 | 5K1Q | | | |
| 150 | R52 | 100KQ | | | |

Referring not to FIGS. 7a, 7b, 7c and 7d, a flow chart showing the steps involved in programming the Energy Saver via the key pads of FIGS. 2 or 4 is shown. The user is prompted to enter the time, the day, the date, and then the user is prompted to go through for each load and determine whether it should be shed and transferred and if so, what time parameter should be used. Up to three different time periods may be selected for each load. If no time parameters are entered, the load may be shed or tranferred, as indicated, 24 hours per day.

Next the user is prompted to indicate if any of the loads should be phase cycle limited, and if so over what time period. Phase cycle limiting allows the user to specify that a particular load should be switched between the various phases at a predetermined interval. For example, the load could be switched between the two main phases every 14 minutes. Phase cycle limiting has more applicability to industrial applications and three phase electrical services. Of course, once a load is switched, the system automatically restabilizes at the optimum balance.

Referring now to FIGS. 8a, 8b, 8c and 8d a flow chart showing the control program is shown. The sensors are sampled every ten seconds. The program performs the decision block every 2 and ½ minutes. However, this time period is arbitrary and could be easily altered. Basically, at the start, the program reads all of the sensors, LOHET 1 through 8, then it looks up data in parameters associated with each of the loads. At the end of the 2½ minutes, a decision must be made based on the data and the readings. The computer calculates which loads to shed and which loads to transfer to achieve the optimum balance in accordance with the parameters fed in by the user for the particular time of day for each load. These instructions are then carried out and the cycle repeats.

In the preferred embodiment, there is a 3 amp imbalance threshold built into the system. In other words, if the imbalance between the two main phases is less than 3 amps, no action is taken. Only if the imbalance exceeds 3 amps does transfer or shedding occur. It should also be noted that the Energy Saver~is also programmed to transfer rather than shed if that will balance the main phases. For example, if a load is indicated as being sheddable, but transferring it from one phase to another will perfectly balance the two phases of a two phase service, then the Energy Saver~will not shed the load, but will transfer it. Any load which is indicated as being sheddable is also transferable, if that will balance the system without having to cut power to a load.

If desired, the Energy Saver~ could be easily modified to specify the priority of Transfer or Shedding of the loads. Therefore, a branch circuit which controlled something relatively unimportant, such as a water heater, could be placed at a high priority level, while the TV for example would receive a low priority level.

It is also contemplated that a stripped down version of the Energy Saver without a LCD or key pad could be produced for the residential home market. The device would come preset to allow Shedding and Transfer of all 6 loads 24 hours per day. The user could control the priority by which loads were connected to which leads. If the user did not wish to allow shedding and transfer of a particular load was, they would simply not hook it up to the energy saver. This type of load could include something like a microwave, which could loss its programming during the brief power lose incurred during transfer, or the longer power lose during shedding.

It is also contemplated that the Energy Saver~could be modified to add peak demand limiting, and duty cycling if desired to further reduce the energy demand.

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for use with a local electrical distribution system having at least first and second loads, the first load drawing a first current and the second load drawing a second current, and in which local electrical distribution system at least first and second differentially phased currents are carried by at least first and second main phase conductors respectively, the apparatus comprising:
   a plurality of first sensors for monitoring at least the first and second currents and for producing first and second signals representative of the first and second currents;
   a plurality of second sensors for monitoring at least the first and second differentially phased currents and for producing third and fourth signals representative of the first and second differentially phased currents;
   control means responsive to at least the first, second, third and fourth signals for determining whether to transfer one of the loads from one conductor to another; and
   at least first and second relays connected to and responsive to the controls means, the first and second relays being associated with the first and second loads respectively.

2. The apparatus of claim 1 in which the control means include storage means for storing user defined data corresponding to characteristics of the first and second loads.

3. The apparatus of claim 2 in which the control means includes a clock and in which the user defined data corresponds to temporal characteristics of the first and second loads.

4. A method for controlling a local electrical distribution system having at least first and second loads, the first load drawing a first current and the second load drawing a second current, and in which local electrical distribution system at least first and second differentially phased currents are carried by at least first and second main phase conductors respectively, the method comprising the steps of:

monitoring at least the first and second currents using sensors to produce first and second signals representative of the first and second currents;

monitoring at least the first and second differentially phased currents using second sensors to produce third and fourth signals representative of the first and second differentially phased currents;

determining whether to transfer one of the loads from one conductor to another using control means responsive to at least the first, second, third and fourth signals; and transferring at least one of the loads under control of the control means.

5. The method of claim 4 further including predetermining and storing in the control means time periods during which one or more of the at least first and second loads may be transferred.

6. The method of claim 4 further including predetermining and storing in the control means time periods during which one or more of the at least first and second loads may be cycled between one or more conductors.

* * * * *